Figure 1:
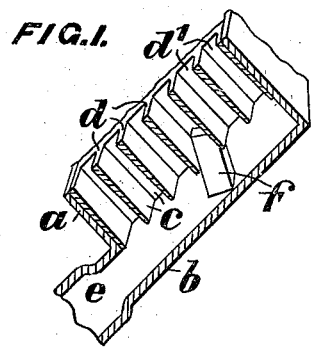

W. S. PARSONS.
DEVICE FOR SORTING AND FEEDING REFUSE.
APPLICATION FILED FEB. 3, 1913.

1,138,245.         Patented May 4, 1915.

UNITED STATES PATENT OFFICE.

WILLIAM STEEL PARSONS, OF LADYWELL, ENGLAND, ASSIGNOR TO J. STONE & COMPANY, LIMITED, OF DEPTFORD, ENGLAND.

DEVICE FOR SORTING AND FEEDING REFUSE.

1,138,245. Specification of Letters Patent. Patented May 4, 1915.

Application filed February 3, 1913. Serial No. 746,020.

*To all whom it may concern:*

Be it known that I, WILLIAM STEEL PARSONS, a subject of the King of Great Britain, and resident of No. 131 Embledon road, Ladywell, in the county of Kent, England, have invented new and useful Improvements in Devices for Sorting and Feeding Refuse, of which the following is a specification.

This invention relates to improvements in selective or sorting devices which are applicable to apparatus for discharging ashes and other refuse particularly from ships. Heretofore, hoppers have been provided with a grid to prevent the entry of unduly large objects, and they have been formed with a slanting side or sides down which the material falling through the grid slides by gravity, or is otherwise caused to move, so as to be discharged from the hopper. Now in grids, or similar selective or sorting devices, heretofore used on board ship in combination with ash and clinker discharge apparatus, provision was made only for dealing with material or objects according to two dimensions, that is to say, only the dimensions of the cross-sectional area of an object were taken into account, supposing the cross-section of the object approaching the grid to be in a plane perpendicular to the direction of the passages through the grid. Or, in other words, the grid only dealt with objects according to the width and thickness of those objects and no account was taken of the length. Thus it came about that very often objects of considerable length, such as steel bolts, were passed to an apparatus because the width and thickness were suitable, whereas such objects should not have been passed as their length was quite unsuitable for the apparatus to deal with them. It will be obvious that if an object is passed having for example a length which is greater than the diameter of the aperture through which it is to be discharged, such object may get fixed across the said aperture and choke the discharge passage or orifice.

The object of the present invention is to provide in connection with the hopper for feeding ash and clinker discharge apparatus, a selective device which has the capacity for dealing with the dimensions of objects in three directions so that objects are selected or sorted cubically and thus it will be no longer possible, if such a device is employed, for objects of unsuitable length to pass through a grid, even if the width and thickness are such as to enable such an object to enter the grid.

According to this invention the hopper for feeding material to ash or clinker discharging apparatus is provided with a grid which is so arranged, or the passages through which grid are so formed that selection according to the three dimensions is performed upon material which is fed through the grid to the discharging apparatus. Therefore, while the apertures in the upper surface of the grid deal with two of the dimensions of an object deposited upon or passing through the grid, the relation of the lower surface of the grid to the bottom or sloping side of the hopper of the discharge apparatus, or the formation of the grid passages deals with the third dimension so that although an object may pass freely through the said apertures it will be arrested by the grid if its length be abnormal. The openings of the grid are preferably square or circular in plan, or they may be square with rounded or cut off corners, or slightly oblong; but preferably the dimension in one direction should not greatly exceed that in the other.

It has of course been heretofore proposed to support sieves and sifting devices above an imperforated surface, and it has also been proposed to employ angle plate sieves for sorting long objects such as oats from round or shorter objects such as wheat. This invention, however, is only concerned with the protection of ashes discharging apparatus such as is used on board ship against clogging and choking, which may, if they occur, seriously hinder the working of the ship; and this protection is afforded as aforesaid by providing the hopper of such discharge apparatus with a cubically selective grid arrangement which operates in the manner hereinafter particularly described.

In order to enable this invention to be readily understood reference is made to the accompanying drawings in which:—

Figure 2:
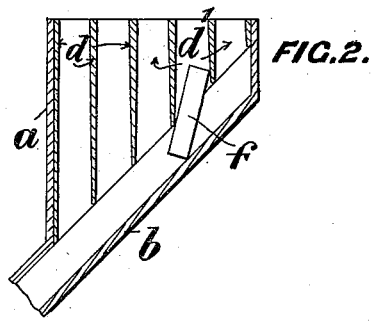
Figure 3:
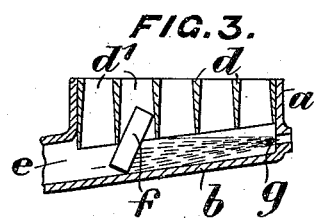
Figure 4:
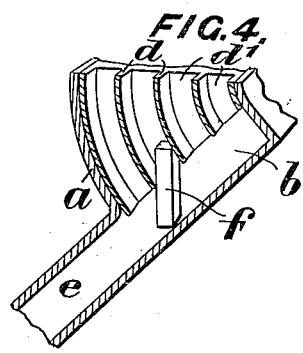
Figure 5:
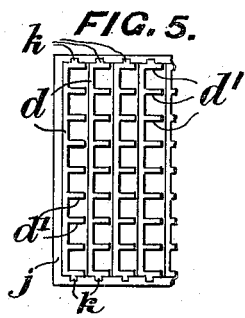
Figure 6:
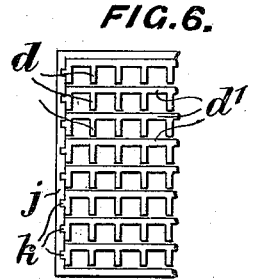

Figure 1 is a view partly in perspective and partly in vertical section of one arrangement of grid and hopper according to the present invention. Figs. 2 and 3 are vertical sections of modifications. Fig. 4 is a view partly in perspective and partly in vertical section of yet another construction and arrangement of grid and hopper. Figs. 5 and 6 are plans illustrating grids formed of assemblages of bars.

Referring to the arrangement illustrated by Fig. 1, $a$ is the hopper which in this example is formed with a sloping bottom $b$. The mouth of this hopper is closed by a grid $c$ which may be composed of an assemblage of bars, as hereinafter described with reference to Figs. 5 and 6, or may be cast in one piece. The bars or ribs $d\ d^1$ forming the grating or grid are all of equal depth and the bars $d$ or both the bars $d$ and $d^1$ may be thinner at the bottom than at the top. The side or bottom $b$ of the hopper is arranged at, say, an angle of 45°, but the angle may be greater or less as desired, and the bottoms of the bars are preferably equidistant from the bottom $b$ of the hopper while the top surfaces of the bars $d\ d^1$ are about parallel to the plane of the hopper bottom $b$. It will be readily understood that, if material is fed on to the top of the grid $c$, all pieces of a suitable size will pass through the grid on to the hopper bottom $b$ and will then pass down the pipe or chute $e$. If, however, a piece $f$ of suitable width and thickness but of excessive length passes through the grid $c$, the lower end of such object comes to rest against the bottom $b$ before the upper end of the piece $f$ has left the grid. Consequently the piece $f$ is prevented from passing to the pipe or chute $e$ by reason of its unsuitable length and may be removed at any time in a suitable manner, as for example, by closing the entrance to the pipe or chute $e$ and lifting the grating or grid.

According to another construction illustrated in Fig. 2 the plane containing the top surfaces of the bars $d\ d^1$ is about horizontal and the bottom or side $b$ of the hopper is inclined more or less, according to the slope required for the material to slide freely toward the outlet or discharge $e$ of the hopper $a$. The bars $d$, or the bars $d\ d^1$, as in Fig. 1, are thinner below than on top and the bars $d$ are progressively made deeper and the bars $d^1$ gradually deeper toward the deeper end of the hopper, that is to say toward the left hand side of Fig. 2, so that all points on the lower edges of the bars are equidistant from the sloping bottom or side $b$ of the hopper. Thus the material may be fed on to the horizontal grating or grid surface and those pieces which are of suitable dimensions in two directions will pass through the apertures of the grid and any of such pieces, as for example pieces similar to that marked $f$, having a third dimension which is excessive, will be arrested in the same way as described with reference to Fig. 1.

Where gravity is not depended upon for discharging the material which is passed by the grid, the angle of slope of the bottom $b$ of the hopper may be less and might even disappear, particularly when, as is the case with some ashes discharging apparatus, a stream of water from a jet $g$, Fig. 3, is directed down or along the bottom or sloping side $b$ of the hopper to wash down or convey away the ashes and other refuse toward the outlet $e$ of the hopper, whence they are discharged, for example, by a stream of water which is forced through a discharge pipe and out into the sea below the water line of the vessel. In the example shown in Fig. 3 the angle of the sloping bottom $b$ may be about 30°, or less, to the horizontal plane.

According to another modification, illustrated in Fig. 4, the bars $d$ are somewhat curved while the bars $d^1$ are straight or flat and with such a construction of bars the lower edges of the latter may all be equidistant from the bottom $b$ of the hopper $a$ by making the bars $d$ progressively deeper as described with reference to Fig. 2.

The grid may for instance be divided into sections in vertical or horizontal planes, or some or all of the bars may be made removable as shown for example in Figs. 5 and 6. In Fig. 5 each bar $d$ is shown formed separately and mounted in say a frame $j$. Each bar is formed with a series of projections so that, when the bars $d$ are in place, corresponding projections on the various bars aline with one another and compose the bars $d^1$ of the grid. The bars $d$ may have end projections $k$ which may be seated in recesses in the side members of the frame $j$ so as to properly position the bars $d$ and to enable any bar to be removed, without disturbing others. In Fig. 6, each bar $d^1$ is formed with a series of projections and by assembling the bars $d^1$ in the frame $j$ the projections in this case compose the bars $d$ as will be readily understood. Of course instead of the square holes shown in Figs. 5 and 6, round holes may be employed or the corners of the square holes may be rounded. Also the holes may in some cases be slightly oblong.

I claim:—

1. A device for sorting and feeding refuse comprising a hopper, a selective or sorting grid covering the hopper and the passages through which have entry apertures of a predetermined area, a surface arranged at a predetermined distance beneath the exit apertures of said passages, and means adapted to discharge to one side of said grid objects capable of passing through said grid and freely deposited on said surface.

2. A device for sorting and feeding refuse comprising a hopper, a selective or sorting device comprising a grid covering the hopper and composed of an assemblage of independent bars each formed with a series of teeth for the formation of the apertures of said grid, said grid being arranged in selective relation with a surface in said hopper.

3. A device for sorting and feeding refuse comprising a hopper having an inclined bottom, a selective or sorting device comprising a grid in the upper end of said hopper, the plane containing the bottom edges of the bars of said grid being parallel with the bottom of said hopper and at a predetermined distance therefrom.

WILLIAM STEEL PARSONS.

Witnesses:
O. J. WORTH,
W. MORBEY.

Copies of this patent may be obtained for five cents each, by addressing the "Commissioner of Patents, Washington, D. C."